United States Patent [19]
Ancel

[11] 3,912,033
[45] Oct. 14, 1975

[54] HYDRAULICALLY OPERATED VEHICLE
[75] Inventor: John F. Ancel, St. Louis, Mo.
[73] Assignee: Ancel Products, Inc., St. Louis, Mo.
[22] Filed: May 17, 1974
[21] Appl. No.: 470,928

[52] U.S. Cl.................. 180/66 R; 91/505; 180/77 R
[51] Int. Cl.[2]......................................... B60K 27/00
[58] Field of Search............... 180/66 R, 77 R, 44 F; 92/12.2; 91/504, 505

[56] References Cited
UNITED STATES PATENTS

| | | | |
|---|---|---|---|
| 2,588,866 | 3/1952 | Moon | 180/66 R |
| 2,957,421 | 10/1960 | Mock | 92/12.2 |
| 3,153,908 | 10/1964 | Lawrence | 180/66 R |
| 3,422,767 | 1/1969 | McAlvay | 91/505 |
| 3,485,315 | 12/1969 | Bergren | 180/66 R |
| 3,500,633 | 3/1970 | Livezey | 180/66 R |
| 3,736,073 | 5/1973 | Walmsley | 91/505 |

FOREIGN PATENTS OR APPLICATIONS

| | | | |
|---|---|---|---|
| 452,363 | 5/1968 | Switzerland | 180/66 R |

*Primary Examiner*—David Schonberg
*Assistant Examiner*—David M. Mitchell
*Attorney, Agent, or Firm*—Lionel L. Lucchesi

[57] ABSTRACT

A hydraulically operated vehicle is provided which combines the desirability of a transmissionless hydraulic drive in a device exhibiting relatively low manufacturing cost, that low cost being obtained at least in part by selective placement of operative components. A pair of wheel drive motors which drive individual wheels for the vehicle are aligned axially and are powered by a fluid pump through a distribution valve, also axially aligned with the wheel motors. This arrangement materially reduces the tubing needed for interconnecting the drive motor and the distribution valve. A hydraulic pump is operatively connected to the distribution valve and is driven by a suitable internal combustion engine. The distribution valve incorporates means for permitting free wheeling vehicle movement. The hydraulic pump receives operator input commands along a linkage structure which is designed to require a greater force for one direction of pump operation and to automatically return to a neutral position in the absence of any operator input commands.

18 Claims, 7 Drawing Figures

3,912,033

HYDRAULICALLY OPERATED VEHICLE

BACKGROUND OF THE INVENTION

This invention relates to hydraulically operated vehicles and in particular, to a low cost device finding application in railroad yards. While the invention disclosed hereinafter is described in particular detail with respect to railroad yard applications, those skilled in the art will recognize the wide applicability of the invention for other uses.

It is conventional, in routine maintenance of railroad rolling stock, to conduct a periodic visual inspection of certain components of the rolling stock. The inspector travels along side the rolling stock conventionally freight or passenger cars, inspecting the wheels and coupling mechanism, and performs minor maintenance as he proceeds from car to car. At one time, it was conventional to walk during this inspection. More recently, vehicles have been developed which enable maintenance personnel to ride while conducting the inspection or maintenance procedures. The inspection and maintenance procedures require that any vehicle in which the inspector rides be able to reverse directions quickly, stop instantaneously and be simple in operation. The vehicle also must be easy to maintain or the use of such vehicles will not justify their maintenance expense. In principle, hydraulically operated vehicles are ideally suited for this type of application in that known hydraulically operated drive motors and pumps may be reversed instantaneously without damage to any system components and without requiring use of a transmission or similar device to accomplish direction change. The term "transmission" in this context is taken to mean mechanically geared systems as opposed to hydraulically operated pumps which may be reversed by changing the position of a variable swash plate in the pump. This last mentioned device sometimes is known in the art as a hydro-transmission and commonly includes a variable displacement over center swash plate, an axial piston pump and a fixed displacement reversible axial piston motor, a charge pump and any required check valves. For the purposes of this specification, the combination of elements just described, hereinafter is referred to as a pump. A connection to the pump swash plate controls the amount of fluid flow from the hydro-transmission or pump to an associated fluid drive motor which in turn determines the speed and direction of the fluid drive motor output shaft, and consequently, the speed and direction of the vehicle.

Various types of hydraulically operated vehicles are known in the art. In general, the prior art devices, while working well for their intended purposes, can be characterized by rather complicated fluid distribution systems or by complex mechanisms which are connected to the pump swash plate for controlling the direction and speed of the vehicle.

The invention disclosed hereinafter differentiates from these prior art devices in that a distribution valve is axially aligned with the axis of the drive wheel motor and the hydraulic pump is positioned adjacent the distribution valve. The term distribution valve is meant to be a generic term for a device which includes a free wheeling control or bypass to enable the vehicle to be pushed by hand and to function as a manifold for the hydraulic system. The pump has novel control structure associated with it which operates in conjunction with an operator foot pedal. The control structure includes means for differentiating the foot pedal pressure required to command forward and reverse positions of the pump, and means for automatically returning the pump to the neutral position in the absence of any foot pedal pressure.

One of the objects of this invention is to provide a low cost, hydraulically operated vehicle structure.

Another object of this invention is to provide a hydraulically operated vehicle having a distribution valve axially aligned with the wheel drive motors of the vehicle.

Another object of this invention is to provide a hydraulically operated vehicle having operator control means operatively connected to a pump structure through a device which requires differentiable operator commands for reversing direction of the vehicle.

Another object of this invention is to provide a hydraulically operated vehicle having a pump including a variable swash plate operatively connected to the means for returning the swash plate to the neutral position upon release of a command stimulus.

Other objects of this invention will become apparent to those skilled in the art in light of the following description and accompanying drawings.

SUMMARY OF THE INVENTION

In accordance with this invention, generally stated, a vehicle is provided with hydraulic drive means controlled through a distribution valve axially aligned with a pair of hydraulic drive motors. The valve includes means for permitting free wheeling vehicle movement. A hydraulic pump is operatively connected to the valve and has linkage means associated with it. The linkage means are interposed between an operator command device and the pump input control. The linkage means is operatively connected to the pump so that the force required to operate the pump in a reverse direction is materially different from the force required to operate the pump in a forward direction. Means are provided for returning the linkage means to a neutral position upon removal of operator command input.

DESCRIPTION OF THE PREFERRED EMBODIMENT

Figure 1:
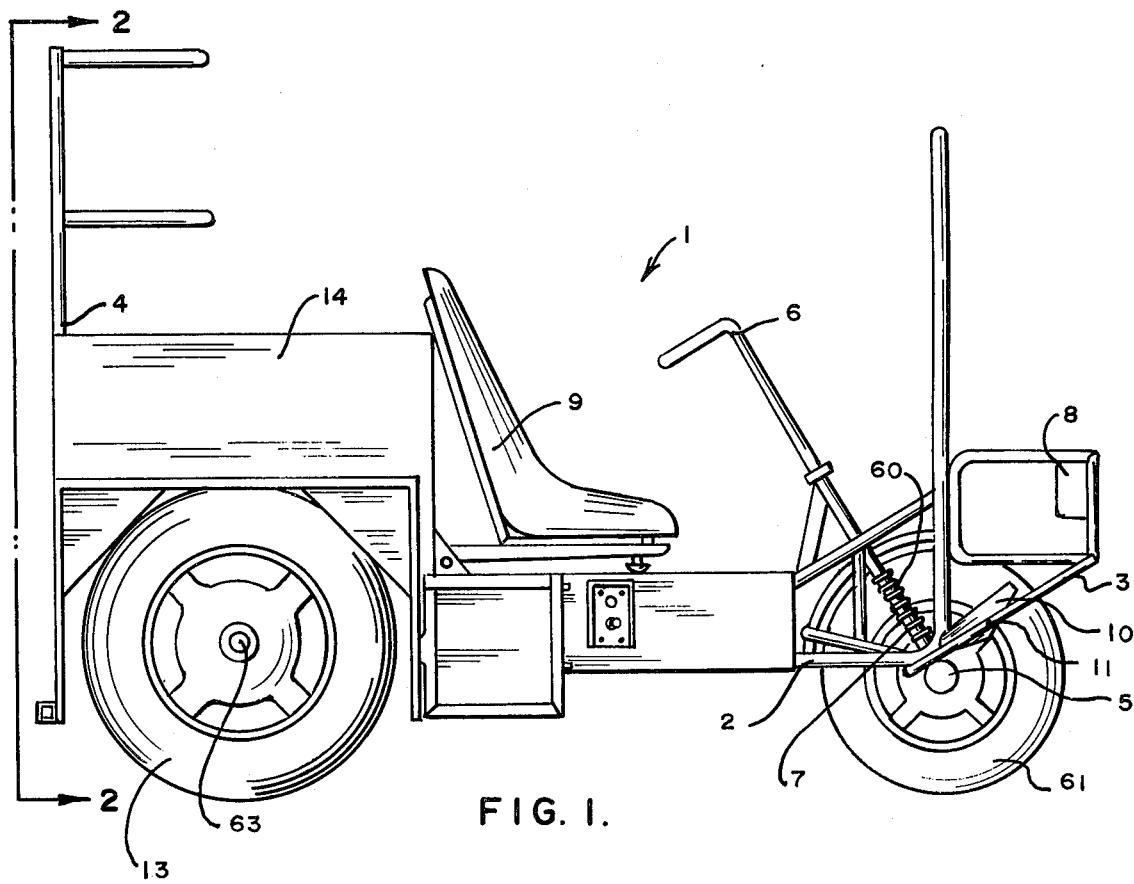
FIG. 1 is a view in side elevation of one illustrative embodiment of hydraulically operated vehicle of this invention.

Referring now to FIG. 1, reference numeral 1 indicates one illustrative embodiment of hydraulically operated vehicle of this invention. The vehicle 1 includes a generally skeleton frame structure 2 having a forward end 3 and a rearward end 4. The particular embodiment illustrated is a three wheeled device, however, various embodimens of this invention may utilize other vehicle wheel arrangements.

The frame 2 is supported along the end 3 by a forward axle 5 operatively connected to a steering arm 6 through a shock absorbing means 7. The frame 2 may include provisions for mounting headlights 8, if desired. The shock absorbing means 7 is conventional and includes a coil compression spring 60 which deadens the transmission of road shock from a front wheel 61, which is mounted for rotation with respect to the axle 5.

Figure 3:
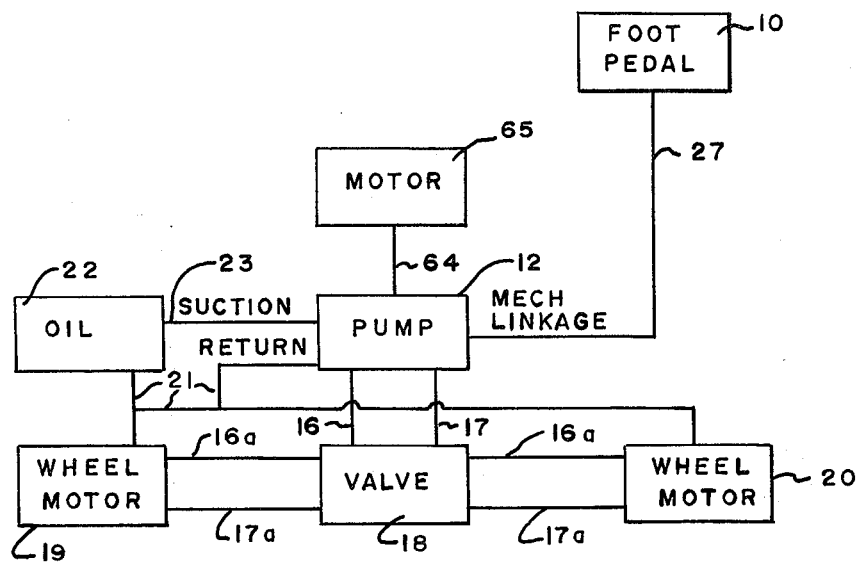
FIG. 3 is a diagrammatic view of the drive system for the vehicle shown in FIG. 1.

A vehicle operator seat 9 is pivotally mounted to the frame 2 and may comprise any convenient design. While a single operator seat is shown in the drawings, other embodiments of this invention have a dual seat arrangement, for example. Pivotal mounting of the seat 9 is desirable in that the seat 9 movement permits easy access to various vehicle components mounted to the frame 2. A foot pedal 10 also is pivotally mounted to the frame 2 along a pivot point axis 11 and is operatively connected to a hydrostatic pump device 12 through a mechanical linkage 27, diagrammatically illustrated in FIG. 3.

Figure 2:
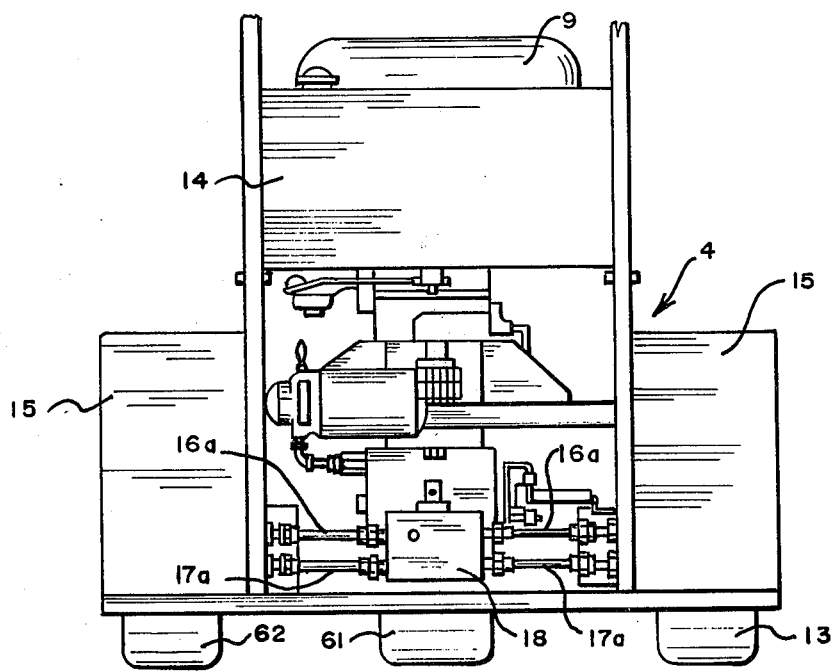
FIG. 2 is a view in end elevation, partly broken away, taken along the lines 2—2 of FIG. 1.

The rearward end 4 of the vehicle 1 is supported by a pair of drive wheels 13 and 62 respectively, which are mounted for rotation along an axis 63. An enclosure 14 is attached to the frame 2 by any convenient method. Conventional threaded fasteners or spot welding works well, for example. The particular embodiment illustrated also includes wheel covers or fenders 15 extending outwardly from the enclosure 14 and at least partially about the drive wheels 13 and 62. The drive wheels 13 and 62, as best seen in FIG. 2, are aligned axially and are positioned outboard of and on opposite sides of the frame 2. The particular form of the frame 2 and its various components are a matter of design choice, which may vary in other embodiments of this invention.

The enclosure 14 is an esthetic feature intended to hide an internal combustion engine or motor 65, which is supportably attached to the frame 2 by any convenient method. The engine 65 includes a drive shaft diagrammatically illustrated by the reference numeral 64 in FIG. 3, which is operatively connected to the pump 12. The output side of the pump 12 includes first and second hydraulic output lines 16 and 17 respectively. The pump 12 may be any one of a variety of devices available commercially. One suitable device may be obtained from the Sundstrand Hydro-Transmission Division of Sundstrand Corporation. Such pumps commonly include a variable displacement, over center swash plate and a charge pump within an enclosure. The swash plate is connected to a shaft which extends through the enclosure. A manual control lever connected to the shaft controls swash plate position, thereby controlling the amount of fluid flow output of the pump which in turn determines the speed and direction of drive wheel motor rotation.

The output lines 16 and 17 are connected through a distribution valve 18 and respective hydraulic line pairs 16a and 17a to a pair of wheel drive motors 19 and 20. The wheel motors 19 and 20 may be purchased commercially and one suitable type is the 3000 series manufactured by the Char-Lynn Division of Eaton Corporation. The lines 16 and 17 and their respective continuations 16a and 17a represent either forward or reverse for the vehicle 1. That is, when the pedal 10 is rotated in one direction about the point 11, the pump 12 causes fluid to flow under pressure through one of the output lines 16 and 17. For example, assume fluid flows from the pump 12 through the line 16. The fluid will flow through the valve 18 to the wheel motors 19 and 20 via the lines 16a causing the wheel motors 19 and 20 to rotate in a first direction. When the foot pedal 10 is rotated in the reverse direction, the pump 12 causes fluid to flow under pressure through the other of the line 16 or line 17, specifically line 17 for the example set forth above. The fluid flow again passes through the valve 18 to the wheel motors 19 and 20 via the line 17a, causing the wheel motors 19 and 20 to rotate in a second direction. The hydraulic system is completed by a return line 21 which feeds the hydraulic system fluid either directly to the pump 12 or to an oil reservoir 22. Fluid in the reservoir 22 may be withdrawn by the pump 12 through a suction line 23. The charge pump portion of the pump 12 is operatively connected to the internal combustion engine 15 along the drive shaft 64.

Figure 4:
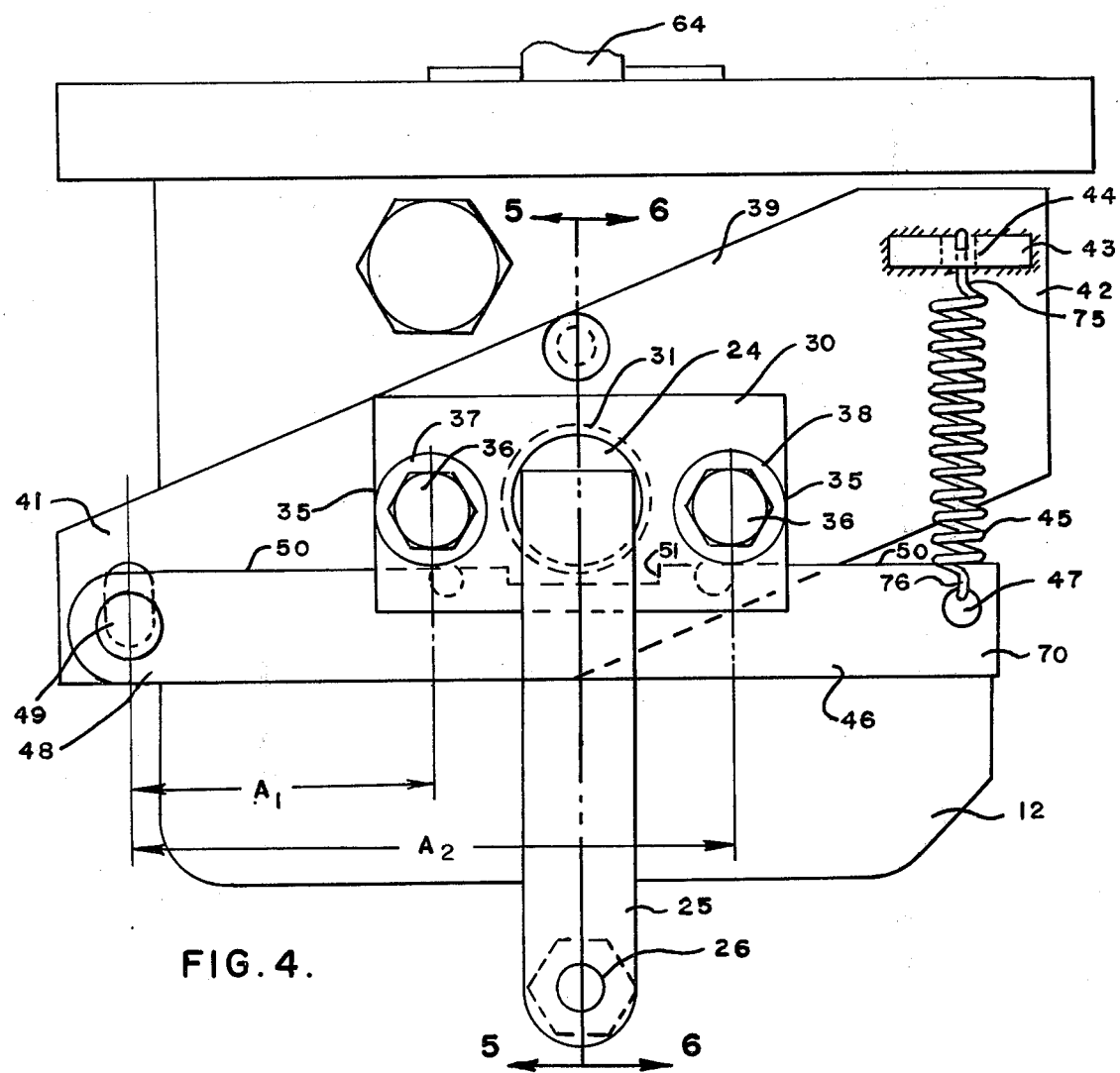
FIG. 4 is an enlarged view in side elevation of the hydraulic pump and associated linkage means utilized with the vehicle of this invention.
Figures 5, 6:
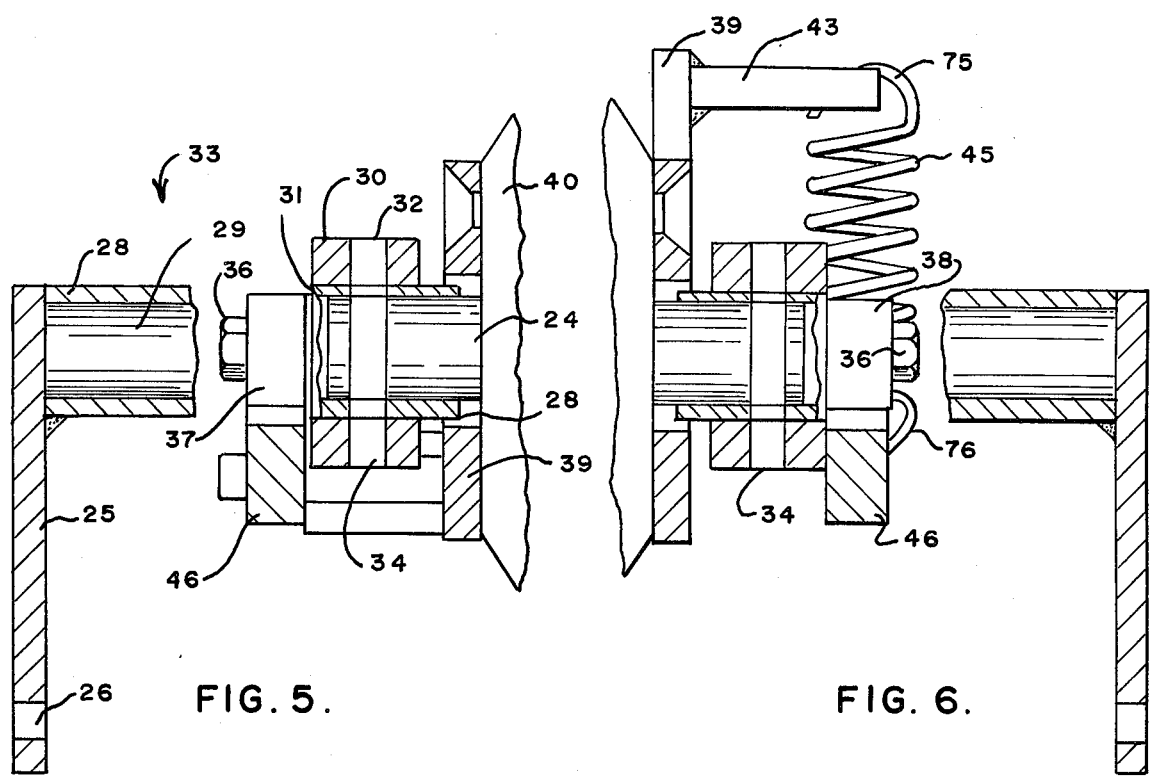
FIG. 5 is a sectional view taken along the line 5—5 of FIG. 4.
FIG. 6 is a sectional view, partly broken away, taken along the line 6—6 of FIG. 4.

In general, the overall operation of the vehicle 1 and its associated hydraulic system is conventional in that it is known in the art that a pedal and linkage can be operatively connected to the swash plate of a pump to vary speed and direction of a vehicle. The vehicle of this invention may be differentiated from prior art known systems by particular aspects of the hydraulic system. Referring now to FIGS. 4, 5 and 6, the pump 12 has an input shaft 24 operatively connected to a swash plate, not shown. As indicated above, the swash plate conventionally may be positioned in a forward, a reverse and a neutral position or positions therebetween by proper rotation of the shaft 24.

A generally flat lever arm 25 having first and second ends has an opening 26 in one of those ends. The opening 26 is useful for connecting the linkage 27 between the input shaft 24 and the foot pedal 10. It is a particular feature of this invention that the foot pedal 10 need be connected to the frame 2 only along the single pivot point axis 11. Linkage 27 may be any suitable conventional flexible or non-flexible device and common round steel stock works well, for example. The second end of the lever arm 25 has a sleeve 28 attached to it by any convenient method. Spot welding works well, for example. The sleeve 28 is a tubular structure having an axial opening 29 in it. The opening 29 is sized to receive the shaft 24 in a press fit and may be bored or otherwise finished in order to facilitate mounting the sleeve and shaft. In the embodiment illustrated, the opening 29 is tapered to aid in fitting the shaft 24 and sleeve 28 to one another. The lever arm 25, sleeve 28, a bearing support plate 30, a pivot bar 46 and a pivot offset structure 39 define, for the purposes of this specification, a control means 33.

The bearing support plate 30 has a central opening 31 through it, which is sized so as to permit the plate 30 to be placed over the sleeve 28. The sleeve 28, the shaft 24, and the bearing support plate 30 each have openings in them indicated generally by the numeral 32 which are aligned in the operative combination of the control means 33 to define a hole 34. The hole 34 is designed to receive a cotter pin or similar device, not shown, which locks the arm 25 and sleeve 28 combination and the bearing support plate 30 to the shaft 24, thereby ensuring simultaneous movement of the shaft 24 with the plate 30 and the arm 25.

Bearing support plate 30 generally is rectangular in plan and, in addition to the opening 31 previously described, has a pair of openings in it, generally indicated by the numeral 35. The openings 35 are positioned outboard and on opposite sides of the central opening 31. Each of the openings 35 receive a conventional threaded fastener 36 which is utilized to attach a bearing 37 and a bearing 38 to the support plate 30. The bearings 37 and 38 are cylindrical bodies having central openings in them for receiving the fastener 36.

The pivot offset structure 39 is attached to an enclosure 40 of the pump 12 by any convenient method. Conventional threaded fasteners work well, for example. The structure 39 has a first end 41 and a second end 42, and generally is an elongated irregular hexagon in plan. The end 42 of structure 39 has a cantilever arm 43 extending perpendicularly from the plane of the structure 39. The arm 43 is attached to the structure 39 by any convenient method along a first proximal end. Again, welding or brazing works well, for example. A second distal end of the arm 43 has an opening 44 in it which provides means for attaching a first end 75 of a spring 45 to the arm 43. A second end 76 of the spring 45 is attached to the pivot bar 46. Spring 45 is a conventional coil spring which is in tension between the arm 43 and the pivot bar 46.

Pivot bar 46 generally is rectangular in plan, having a first end 70 and a second end 48. The end 70 has an opening 47 in it, through which the end 76 of the spring 45 is inserted to attached the spring 45 to the bar 46. The second end 48 of bar 46 is pivotally mounted to the end 41 of the structure 39 about a point generally indicated by the numeral 49. Provisions may be made for adjusting the vertical height, referenced to in FIG. 4, of the bar 46, if desired. The bar 46 includes an upper edge 50 which abuts the bearings 37 and 38 at two points along the outer surface of those bearings. The edge 50 has a cut-out 51 in it, which merely serves as a clearance opening for the sleeve 28 in the particular embodiment illustrated. Cut-out 51 may be eliminated in other embodiments of this invention.

The structure thus described is important in the operation of the vehicle because it requires that a different force be applied on the foot pedal 10 in order to rotate the shaft 24 in a clockwise as opposed to a counter clockwise direction. Thus, for example, movement of the lever arm 25 in a counter clockwise direction, as referenced to FIG. 4, forces the bearing 37 against the bar 46, and disengages the bearing 38 from contact with the bar 46. As the lever arm 25 continues to move counter clockwise, the bearing 37 applies a force on the bar 46 which tends to rotate the bar 46 about the point 49 against the tension bias of the spring 45. The distance between the point 49 and the bearing 37-bar 46 contact point defines a first lever arm A1 which requires a certain predetermined force in order to rotate the bar 46 about the point 49 and in turn permit rotation of the shaft 24. In like manner, rotation of the lever 25 in a clockwise rotation forces the bearing 38 against the pivot bar 46 and disengages the bearing 37 from contact with the bar 46. As the lever arm 25 continues to move clockwise, the bearing 38 applies a force on the bar 46 which tends to rotate the bar 46 about the point 49 against the tension bias of the spring 45. The distance between the point 49 and the bearing 38-bar 46 contact point defines a second lever arm A2 which requires a second materially different force in order to rotate the bar 46 about the point 49 and in turn permit rotation of the shaft 24. Since the arm A2 is greater than the arm A1, less force is required to rotate the shaft 24 in the clockwise direction. This is an important aspect of my invention. When the foot pedal 10 is coupled to the lever 25 as previously described, operator rotation of the foot pedal 10 will move the lever 25 either in a clockwise or counter clockwise direction and will control the position of the swash plate in the pump 12, thereby controlling movement of the vehicle. Since one direction of foot pedal 10 rotation will require greater pressure on the part of the operator to commence vehicle movement, the operator is able to determine which direction the vehicle will proceed without any other conscience effort on his part. The spring 45, in addition to its function of providing a biasing force on the bar 46, acts as a centering means and insures that the bar 46 will return to a horizontal attitude upon the removal of an applied force on the foot pedal 10. Consequently, the vehicle may be stopped by the operator simply by removing pressure from the foot pedal 10. The swash plate of the pump 12 thereafter will automatically return to the neutral position, a condition which prevents fluid flow from the pump 12.

As described above and shown in FIG. 2, the distribution valve 18 serves as both a bypass and manifold valve and is aligned axially with respect to the wheel motors 19 and 20. This is another important feature of my invention because use of an independent distribution valve and that valve's axial alignment with the wheel drive motors permits the use of a minimum line 16a and line 17a length run between the distribution valve and the wheel drive motors. In addition to the savings realized because of the reduced use of tubing, such an arrangement lessens the chance of hydraulic line malfunction and places the majority of the hydraulic line runs in a location convenient to maintenance personnel. With this arrangement, the pump 12 may be placed adjacent the valve 18, thereby further reducing both the length of run for the lines 16 and 17 and the possibility of hydraulic line leakage along the lines.

Figure 7:
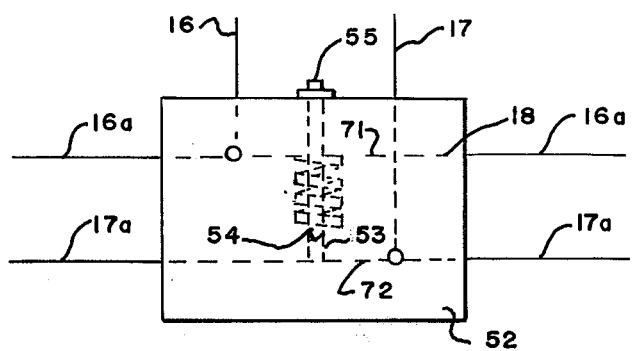
FIG. 7 is a diagrammatic view of the bypass valve and manifold which permits free wheeling operation of the vehicle of this invention.

The valve 18 has a generally rectangular body 52 having four outlet interfaces for connecting the inlet lines 16 and 17 to the outlet line pairs 16a and 17a. A pair of channels 71 and 72 are formed within the body 52 and connect the inlet lines 16 and 17 to the outlet lines 16a and 17a respectively. Body 52 also has a passage 53 running between the channels 71 and 72, as diagrammatically illustrated in FIG. 7. The passage 53 defines a valve seat 54 for a valve 55 which may be threadedly secured against the valve seat 54 to block the passage 53. The valve 55 is adjusted to open the passage 53 and permit circulation of the hydraulic fluid between the line pairs 16a and 17a, whenever a free wheeling operative condition of the vehicle 1 is desired.

From the foregoing, it may be seen that this invention is one well adapted to attain all the ends and objects herein set forth, together with other advantages which are obvious and which are inherent to the structure. It also will be understood that certain features and subcombinations are of utility and may be employed without reference to other features and subcombinations. This is contemplated by and is within the scope of the appended claims.

Numerous variations, within the scope of the appended claims, will occur to those skilled in the art in light of the foregoing description and accompanying drawings. Thus, the overall design appearance of the vehicle may be varied. For example, the vehicle 1 may be provided with additional seating or may be adjusted for load carrying applications. The design of the distribution valve 18 may be changed. While the valve 55 is described as threadedly secured against the seat 54, the valve 53 may be designed as a rotating assembly, if desired. In general, such rotating assemblies are more expensive to produce than the device described. As indicated, other wheel arrangements may be utilized. While certain specific components useful in the manufacture of the vehicle 1 were described above, those skilled in the art will recognize that both other valve components or components supplied by other manufacturers may be used, if desired. These variations are merely illustrative.

Having thus described the invention, what is claimed and desired to be secured by Letters Patent is:

1. In a hydraulically operated wheeled vehicle including a hydraulic pump for supplying a varying rate of fluid flow, said pump including a rotatably mounted input shaft, said shaft being rotatable in a clockwise direction and counterclockwise direction, at least one hydraulic drive motor operatively connected to said pump and adapted to drive a wheel of said vehicle in a forward direction and a rearward direction, the direction of said wheel drive being dependent upon the direction of rotation of the input shaft of said pump, means for driving said pump, and operator means for signalling a command input rotation to said pump input shaft, the improvement which comprises linkage means interposed between said signalling means and said pump input shaft, said linkage means comprising a lever arm mounted to said input shaft and adapted to rotate with said shaft about a shaft axis, said shaft and said lever arm having a neutral position, said lever arm being operatively connected to said signalling means, and means for varying the effective pivot point of said lever arm with respect to said input shaft so that the force required to rotate said input shaft in the clockwise direction is materially different from the force required to rotate said input shaft in the counterclockwise direction from the neutral position.

2. The improvement of claim 1 wherein said effective pivot point varying means comprises a bar having a first end and a second end, said bar being positioned near said input shaft and being pivotally mounted to said pump at one of said first and second ends, and pivot means operatively connected between said input shaft and said bar, said pivot means including a pair of bearings, respective ones of said bearings being positioned outboard and on opposite sides of said input shaft, one of said bearings abutting said bar as said input shaft is rotated clockwise from the neutral position and the other of said bearings abutting said bar as said shaft is rotated in a counterclockwise direction from the neutral position.

3. The improvement of claim 2 further characterized by centering means operatively connected between the other of said first and second ends of said bar and said pump, said centering means positioning said bar at the neutral position in the absence of any force stimulus on said input shaft.

4. The improvement of claim 3 wherein said operator signalling means comprises a foot pedal pivotally mounted to said vehicle.

5. The improvement of claim 3 wherein said pivot means comprises a support plate mounted to said input shaft, said bearing pair being mounted to said support plate on opposite sides of said shaft, at least an individual one of said bearing pair being in physical contact with said bar in all positions of said input shaft.

6. The improvement of claim 1 further characterized by a pair of hydraulic motors operatively connected to said pump and adapted to drive individual wheels of said vehicle, and a valve member axially aligned with said wheel motors, said valve member having two channels for fluid flow therein between respective ones of said wheel motors and said pump, and means for interconnecting said channels, said valve member including a block structure having two inputs and four output connections, said means for interconnecting said channels comprising a threaded member closing said interconnecting means in a first position of said threaded member.

7. A hydraulically operated vehicle comprising:
a frame, said frame being supported by at least three wheels, at least two of said wheels being axially aligned on opposite sides of one end of said frame;
a hydraulic distribution system axially aligned with said wheels for driving said wheels, said hydraulic distribution system comprising first and second drive motors hydraulically connected to a distribution valve member, said valve member being axially aligned with said drive motors;
a pump operatively connected to said drive motors through said distribution valve member, said pump including a variable swash plate and a rotatable shaft operatively connected to said swash plate;
means for driving said pump;
means for signalling pump output direction operatively connected to said shaft; and
means for requiring a first force signal for commanding a first pump output direction and for requiring a materially different second force signal for commanding a second pump output direction, said force requiring means being mounted to said pump and being operatively connected to said signalling means.

8. The vehicle of claim 7 further characterized by means for automatically returning said pump to a neutral position in the absence of any force signal stimulus, said return means being operatively connected between said force requiring means and said pump.

9. The vehicle of claim 8 wherein said means for varying the force of the signal stimulus comprises a bar having a first end and a second end positioned adjacent but spaced from said shaft, said bar being attached to said pump at one of said first and said second ends, and means for controlling pump output direction, said output direction controlling means comprising a lever arm operatively connected to said shaft and pivot means operatively connected between said input shaft and said bar.

10. The vehicle of claim 9 wherein said distribution valve member comprises a block structure having two input channels and four output channels, each of said input channels being operatively connected to two opposite output channels, an interconnection channel between said four output channels, and a threaded member threadedly mounted in said interconnection channel between a first position closing said interconnection channel and a second position opening said interconnection channel, thereby permitting free wheel operation of said vehicle.

11. In a hydraulically operated wheeled vehicle including a hydraulic pump, at least two hydraulic motors operatively connected to said pump, said pump having an input shaft and a hydraulic output adapted to drive individual ones of a plurality of wheels of said vehicle, at least two of said wheels being aligned so as to define a wheel axis, means for driving the pump and operator means for signalling a command input to said input shaft, the improvement comprising a distribution valve member aligned with said wheel axis, said valve member having two channels for fluid flow therein between respective ones of said wheel motors and said pump, and means for interconnecting said channels, said valve member including a block structure having two input and four output connections, an interconnection channel between said four output channels and a threaded member threadedly mounted in said interconnection channel between a first position closing said interconnection channel and a second position opening said interconnection channel and allowing fluid flow between said four output channels, thereby permitting free wheel operation of said vehicle.

12. The improvement of claim 11 further characterized by means for varying the force of a signal stimulus required for signalling a command input to said input shaft operatively connected between said pump and said pump input shaft.

13. The improvement of claim 12 wherein said pump is further characterized by a variable swash plate operatively connected to said input shaft, and means for automatically returning said pump to a neutral position in the absence of any signal stimulus.

14. The improvement of claim 13 wherein said means for varying the force of a signal stimulus required for signalling a command input to said shaft comprises a bar having a first end and a second end, said bar being positioned adjacent but spaced from said input shaft and attached to said pump at one of said first and said second ends.

15. A hydraulically operated vehicle comprising:
a frame, said frame being supported by at least three wheels, at least two of said wheels being axially aligned on opposite sides of one end of said frame;
a hydraulic distribution system axially aligned with said wheels for driving said wheels, said hydraulic distribution system comprising first and second drive motors hydraulically connected to a distribution valve member;
a pump operatively connected to said drive motors through said distribution valve member, said pump including a variable swash plate and a shaft operatively connected to said swash plate, the output of said pump being adapted to power said drive motors in a first direction of movement and a second direction of movement;
means for driving said pump;
means for signalling pump output direction operatively connected to said shaft, said direction signalling means comprising a lever arm operatively connected to said shaft, and pivot means operatively connected to said input shaft, said pivot means including first and second bearings positioned on opposite sides of said shaft; and
means for varying the force of the signal stimulus required for commanding pump output direction mounted to said pump and operatively connected to said signalling means such that the first direction of movement of said drive motors requires a substantially greater force for the signal stimulus than the force required for the signal stimulus directing the second direction of movement of said drive motors, said force varying means comprising a bar having a first end and a second end, said bar being positioned adjacent, but spaced from said input shaft and rotatably attached to said pump at its first end, at least one of the bearings of said pivot means being in abutment with said bar in all positions of said swash plate.

16. The vehicle of claim 15 further characterized by means for automatically returning said pump to a neutral position in the absence of any signal stimulus operatively connected between the second end of said bar and said pump.

17. The vehicle of claim 16 wherein said distribution valve member is axially aligned with said drive motors.

18. The vehicle of claim 17 wherein said distribution valve member comprises a block structure having two input channels and four output channels, each of said input channels being operatively connected to two opposite output channels, an interconnection channel between said four output channels and a member threadedly mounted in said interconnection channel between a first position closing said interconnection channel and a second position opening said interconnection channel, thereby permitting fluid flow between said four output channels within said block structure.

* * * * *